United States Patent [19]

Steiner

[11] 4,259,304

[45] Mar. 31, 1981

[54] ACTIVATION OF COAL

[75] Inventor: Peter Steiner, Edison, N.J.

[73] Assignee: Foster Wheeler Energy Corporation, Livingston, N.J.

[21] Appl. No.: 73,339

[22] Filed: Sep. 7, 1979

[51] Int. Cl.$^3$ .......................... B01D 5/00; B01J 21/18
[52] U.S. Cl. .................................... 423/244; 252/445; 252/447
[58] Field of Search .............................. 252/445, 447; 423/244 R

[56] References Cited

U.S. PATENT DOCUMENTS

| | | | |
|---|---|---|---|
| 2,708,208 | 5/1955 | Furman | 252/447 |
| 4,024,076 | 5/1977 | Miyake et al. | 252/447 |
| 4,140,752 | 2/1979 | Ratcliffe | 423/422 R |
| 4,147,762 | 4/1979 | Steiner | 423/563 |

*Primary Examiner*—John F. Niebling
*Attorney, Agent, or Firm*—Marvin A. Naigur; John E. Wilson; John J. Herguth, Jr.

[57] ABSTRACT

The activation of coal, in which coal that has been partially oxidized with Sulfur Dioxide is introduced into a reaction zone. The coal is contacted with superheated steam and then impregnated with vanadium.

25 Claims, No Drawings

ACTIVATION OF COAL

BACKGROUND OF THE INVENTION

The present invention relates to a method for activating coal for use as an adsorbent, the activated coal and a method of adsorbing impurities from effluent gases using the activated coal. The invention finds particular utility in the adsorption of $SO_2$ from effluent gases.

It is well known that substantial quantities of sulfur dioxide are released into the air each year by the burning of sulfur-containing coal and oil and the refining of oil and various metals. Sulfur dioxide concentrations of only a few parts per million (ppm) in air can cause breathing difficulty, kill plants, and accelerate the deterioration of paper, leather and limestone building materials. Therefore, federal, state and local governments have placed restrictions on the amount of $SO_2$ which can be discharged into the atmosphere.

In an effort to remove sulfur dioxide from effluent gases, various forms of carbon have been suggested as adsorbents. For example, Ninomiya et al, U.S. Pat. No. 3,544,263, discloses that it is known that sulfur dioxide can be removed from gases with metallic oxides such as vanadium oxide, coke or conventional activated carbon. The patent describes a novel adsorbent prepared from a mixture of finely ground bituminous coal and an inorganic sodium or potassium compound. The mixture is gasified with steam, carbon dioxide, flue gas, sulfur dioxide, air or a mixture of these gases. Dimitri, U.S. Pat. No. 3,886,093 discloses an $SO_2$ adsorbent prepared from liquid having active metal sites, such as vanadium metal sites.

A special activated coke (BF char) is used to adsorb sulfur dioxide in the Bergbau Forschung process described in P. Steiner et al, "Removal and Reduction of Sulfur Dioxides from Polluted Gas Streams," 1975 *Advances in Chemistry Series*, No. 139, at 180. This material is an excellent adsorbent. However, it is extremely expensive. Therefore, a less expensive material having similar adsorbtion characteristics is needed.

SUMMARY OF INVENTION

This invention provides an inexpensive adsorbent material which is almost as effective in removing sulfur dioxide as the BF char. The adsorbent is inexpensive because it is made from a by-product of a commercial process. Therefore, raw material costs are nominal. Moreover, the steps required to activate the by-product are simple and inexpensive.

More specifically, the by-product is the coal used in the RESOX ® process to convert sulfur dioxide to sulfur. This coal has been partially oxidized with sulfur dioxide, preferably in the presence of at least one mole of steam. This partially oxidation should preferably have occurred at temperatures of less than 2000° F., preferably between 1150° F. and 1550° F.

The partially oxidized coal is introduced into a reaction zone where it is contacted with superheated steam, preferably at a temperature of from about 1300° F. to about 1600° F. The preferred temperature range is about 1400° F. to about 1550° F.; with about 1500° F. being the most preferred temperature. The coal is contacted with the steam for a period of from about two to about ten hours, preferably about four to about six hours.

The coal is then activated by impregnating it with vanadium. Impregnation can be accomplished by contacting the coal with a solution or a suspension of a vanadium compound. The preferred compound is ammonium vanadate because it can be dissolved in water.

After the coal is dried it can be used in place of any conventional sulfur dioxide adsorbent. It can be regenerated in the same manner as conventional activated char adsorbents.

DETAILED DESCRIPTION OF THE INVENTION

The activated adsorbent of this invention is prepared from a coal which is partially oxidized with sulfur dioxide. The coal is preferably anthracite, although bituminous coal can also be used. It should be preferably granular and have a relatively uniform particle size.

The partially oxidized coal should contain from about 40 to about 60 (wt.)%, preferably about 50 (wt.)%, of the carbon content of the unoxidized coal. It is anticipated that coals having carbon contents of approximately 20 (wt.)% can be used. However, coals with less than about 40% carbon will be fragile, will have inferior adsorption capacity and will be difficult to regenerate properly. On the other hand, coals containing more than 60% carbon will have a low porosity. As a result they will have a lower adsorption capacity and will be difficult to activate.

The coal is preferably partially devolatilized and oxidized by reaction with $SO_2$ during the RESOX ® process. This process is described in U.S. Pat. No. 4,147,762 and in P. Steiner et al, "Removal and Reduction of Sulfur Dioxides from Polluted Gas Streams," 1975 *Advances in Chemistry Series*, No. 139, at 180, both of which are incorporated herein by reference. Briefly, in the RESOX process, sulfur dioxide in admixture with at least one mole of steam is contacted with coal and the $SO_2$ is converted to sulfur. The conversion occurs at a temperature substantially below the temperature at which conversion to sulfur would occur in the absence of water. It is generally less than 2000° F. and preferably between 1150° F. to 1550° F. The conditions at which RESOX process is operated are not critical to this invention. It is only necessary that the feed rate of the coal through the RESOX unit be adjusted so that the spent coal will contain from about 40 to about 60 (wt.)% of the original carbon.

The oxidized coal from the RESOX process is preferred because it is a by-product of a commercially operating process. It is, therefore, inexpensive. As a result, the adsorbent produced by this invention is substantially cheaper than commercially available materials. Any coal which has been partially oxidized with $SO_2$ can, however, be used. The use of such alternative source of raw material will substantially increase the cost of the final product.

The partially oxidized coal is activated in a two step process. In the first step, the coal is contacted with steam. In the second, it is impregnated with vanadium. This sequence is critical to the invention. If vanadium impregnation occurs first, the resulting adsorbent will have a much lower capacity.

The partially oxidized coal is contacted with steam maintained at a temperature of from about 1300° to about 1600° F., preferably about 1400° to about 1550° F. With anthracite coals the preferred temperature is approximately 1500° F. At temperatures of 1000° to 1200° F. the adsorbent was not sufficiently activated. When temperatures substantially in excess of 1600° F. are used, the resulting material is very porous and weak. It is too friable to be used as a sorbent in a commercial process.

The coal should be contacted with steam for a period of from two to ten, preferably four to six, hours. In most cases, six hours is the maximum. Longer times increase the cost without substantially increasing the capacity of the adsorbent. In fact, extended contact with steam can produce a structurally weak material.

Generally, the capacity of a sorbent will increase with increasing time. For example, when a sorbent was contacted with steam for two hours its removal efficiency dropped below 95% after four hours. When the same sorbent was activated for six hours the removal efficiency dropped below 95% after eleven hours.

The optimum time of contact will depend on the steam temperature. Generally, the lower the temperature the longer the period of contact. For example, tests have indicated that activation at 1400° F. for six hours is comparable to activation at 1600° F. for two hours. However, activation for six hours at 1600° F. produced a material which was so porous and weak that it could not be used.

Although the rate which the steam is fed to the reaction zone is not critical, it is preferably supplied at a rate of 0.25 to 1.0 lb./hr/lb. of coal, preferably at a rate of 0.75 lb./hr/lb. of coal.

After the coal has been contacted with the steam, it is impregnated with vanadium. This can be achieved by soaking the coal in a solution of a vanadium compound. Alternatively, the coal can be sprayed with such a solution. A suspension of a vanadium compound can also be used.

The preferred compound is ammonium vanadate because it can be dissolved relatively easily in water or oxalic acid and the impregnated coal can be processed easily and quickly. It can be dried at 250° F. in a relatively short time.

Vanadium pentoxide is less preferred because it must be dissolved in sulfuric acid. It is difficult to dissolve even in this solvent. Moreover, the impregnated coal must be handled with extreme care until it is completely dry. Drying can take as long as six hours at 800° F.

Although the concentration of vanadium is not critical, the solution or suspension should be as saturated with vanadium. If, however, the viscosity is too great to permit impregnation, a lower concentration can be used. Satisfactory results have been obtained with solutions containing 1.2 (wt.)% ammonium vanadate in water, 1.0 (wt.)% ammonium vanadate in oxalic acid and 3.4% vanadium pentoxide in sulfuric acid.

The coal is soaked or sprayed with the vanadium compound for a sufficient period of time to produce an adsorbent which contains at least 0.01 (wt.)%, preferably 0.1–0.3 (wt.)% vanadium. One-half hour has been found to produce satisfactory results in small scale tests. However, it is believed that satisfactory results will also be obtained with smaller or larger times. One skilled in the art will easily be able to determine the appropriate soaking time for each particular coal.

After impregnation is complete, the coal should be dried. The dried coal should contain at least 0.01 (wt.)% vanadium; preferably 0.1 to 0.3 (wt.)%. Larger amounts of vanadium will provide good adsorbents. However, vanadium is expensive and the benefits that might be obtained from the use of larger quantities of this metal are not outweighed by its cost.

The resultant adsorbent is suitable for use in any process in which $SO_2$ is removed from a gas stream by contacting the $SO_2$ containing gas with an adsorbent. One such process is described in P. Steiner et al, "Removal and Reduction of Sulfur Dioxides from Polluted Gas Streams," 1975 *Advances in Chemistry Series,* No. 139, at 180.

I claim:
1. A method of preparing activated coal comprising:
    introducing into a reaction zone coal which has been partially oxidized with $SO_2$;
    contacting said coal with superheated steam; and then impregnating said coal with vanadium.
2. The method of claim 1 wherein said steam is at a temperature of from about 1300° F. to about 1600° F.
3. The method of claim 2 wherein said steam is at a temperature of from about 1400° F. to about 1550° F.
4. The method of claim 3 wherein said steam is at a temperature of about 1500° F.
5. The method of claim 4 wherein said coal is an anthracite coal.
6. The method of claim 1 wherein said coal is contacted with said steam for a period of from about two to about ten hours.
7. The method of claim 6 wherein said coal is contacted with said steam for a period of from about four to about six hours.
8. The method of claim 1 wherein said coal is impregnated with vanadium by contacting said coal with a solution of a vanadium compound.
9. The method of claim 8 wherein said vanadium compound is ammonium vanadate or vanadium pentoxide.
10. The method of claim 8 wherein said coal is contacted with said solution for a sufficient period of time to produce an adsorbent which contains at least about 0.01 (wt.)% vanadium.
11. The method of claim 10 wherein said coal is contacted with said solution for a sufficient period of time to form an adsorbent which contains from about 0.1 to about 0.3 (wt.)% vanadium.
12. A method of preparing activated coal comprising:
    introducing into a reaction zone coal which has been partially oxidized with $SO_2$;
    contacting said coal with steam at a temperature of from about 1400° F. to about 1550° F. for a period of from about four to about six hours; and then
    contacting said coal with a solution of a vanadium compound for a period of time sufficient to impregnate said coal with at least about 0.01 (wt.)% vanadium.
13. The method of claim 12 wherein said coal is anthracite coal.
14. The method of claim 12 wherein said coal is contacted with said solution for a sufficient time to impregnate said coal with from about 0.1 to about 0.3 (wt.)% vanadium.
15. The method of claim 12 wherein said solution is ammonium vanadate dissolved in oxalic acid or water.
16. A method of preparing activated coal comprising:
    introducing into a reaction zone a coal which has been partially oxidized by $SO_2$ in the presence of at least about one mole of steam at a temperature of less than 2000° F., said coal containing 40–60 (wt.)% of its original carbon;
    contacting said coal with steam at a temperature of from about 1400° F. to about 1550° F. for a period of from about four to about six hours; and then contacting said coal with a solution of a vanadium compound for a period of time sufficient to impregnate said coal with at least about 0.01 (wt.)% of vanadium.

17. The method of claim 16 wherein said coal is anthracite coal.

18. The method of claim 16 wherein said coal is contacted with said solution for a sufficient time to impregnate said coal with from about 0.1 to about 0.3 (wt.)% vanadium.

19. The method of claim 16 wherein said solution is ammonium vanadate dissolved in oxalic acid or water.

20. An activated coal containing at least about 0.01 (wt.)% vanadium prepared by:
introducing into a reaction zone coal which has been partially oxidized with $SO_2$;
contacting said coal with superheated steam; and then
impregnating said steam activated coal with vanadium.

21. An activated coal containing at least about 0.01 (wt.)% vanadium prepared by:
introducing into a reaction zone coal which has been partially oxidized with $SO_2$;
contacting said coal with steam at a temperature of from about 1400° F. to about 1550° F. for a period of from about four to about six hours; and then
contacting said coal with a solution of a vanadium compound for a period of time sufficient to impregnate said coal with at least about 0.01 (wt.)% vanadium.

22. An activated coal containing at least about 0.01 (wt.)% vanadium prepared by:
introducing into a reaction zone a coal which has been oxidized by $SO_2$ in the presence of at least about one mole of steam at a temperature of less than 2000° F., said coal containing 40-60 (wt.)% of its original carbon;
contacting said coal with steam at a temperature of from about 1400° F. to about 1550° F. for a period of from about four to about six hours; and then
contacting said coal with a solution of a vanadium compound for a period of time sufficient to impregnate said coal with at least 0.01 (wt.)% vanadium.

23. The activated coal of claim 22 wherein said coal contains from about 0.1 to about 0.3 (wt.)% vanadium.

24. The activated coal of claim 22 wherein said coal is anthracite coal.

25. In a method of removing $SO_2$ from a gas containing $SO_2$ wherein said gas is contacted with an adsorbent and the adsorbent is regenerated, the improvement wherein said adsorbent is a coal containing at least about 0.01 (wt.)% vanadium and is prepared by:
contacting with superheated steam a coal which has been oxidized with $SO_2$ and then
impregnating said steam activated coal with vanadium.

* * * * *